United States Patent [19]

Nagano

[11] Patent Number: 4,489,307
[45] Date of Patent: Dec. 18, 1984

[54] HANDLE STEM FOR A BICYCLE

[75] Inventor: Masashi Nagano, Izumi, Japan

[73] Assignee: Shimano Industrial Company Limited, Osaka, Japan

[21] Appl. No.: 377,802

[22] Filed: May 13, 1982

[30] Foreign Application Priority Data

May 23, 1981 [JP] Japan .............................. 56-74929[U]
Jun. 23, 1981 [JP] Japan .............................. 56-93338[U]

[51] Int. Cl.³ .................. B60Q 1/34; G06D 1/00; H05B 37/00
[52] U.S. Cl. ..................................... 340/134; 73/495; 364/424
[58] Field of Search ............... 340/134, 135; 324/160, 324/166; 73/490; 364/424, 424.1, 565; 377/24, 49

[56] References Cited

U.S. PATENT DOCUMENTS

| 2,168,939 | 8/1939 | Kraeft ............................... 74/551.8 |
| 2,169,256 | 8/1939 | Kraeft ............................... 74/551.8 |
| 3,898,563 | 8/1975 | Erisman ............................. 324/166 |
| 3,970,935 | 7/1976 | Beery et al. ....................... 324/166 |
| 4,071,892 | 1/1978 | Genzling ........................... 364/565 X |
| 4,117,457 | 9/1978 | Latta ................................. 340/134 |
| 4,156,190 | 5/1979 | Chittenden et al. ............. 73/490 X |
| 4,290,047 | 9/1981 | Latta, Jr. .......................... 324/160 X |
| 4,363,022 | 12/1982 | Manacci ........................... 340/134 X |
| 4,435,983 | 3/1984 | Shimano .......................... 73/493 |

FOREIGN PATENT DOCUMENTS

| 301636 | 12/1928 | United Kingdom ............... 116/62.4 |
| 452179 | 8/1936 | United Kingdom ............... 74/551.1 |
| 479213 | 2/1938 | United Kingdom ............... 74/551.1 |
| 520556 | 4/1940 | United Kingdom ............... 74/551.1 |
| 523725 | 7/1940 | United Kingdom ............... 74/551.1 |
| 694255 | 7/1953 | United Kingdom ............... 74/551.1 |

Primary Examiner—Daniel M. Yasich
Attorney, Agent, or Firm—Stevens, Davis, Miller & Mosher

[57] ABSTRACT

A handle stem for a bicycle which comprises a stem body, a projecting portion extending radially outwardly from the top of the body, and a holding portion provided at the utmost end of the projecting portion, and is provided at the upper portions of the projecting portion and holding portion with a mounting surface made continuous on the same plane so that on the mounting surface is mounted a box of a display apparatus for electrically displaying operation, such as speed or a running distance, of the bicycle, the box being formed about the same in shape and plane size as the mounting surface.

7 Claims, 5 Drawing Figures

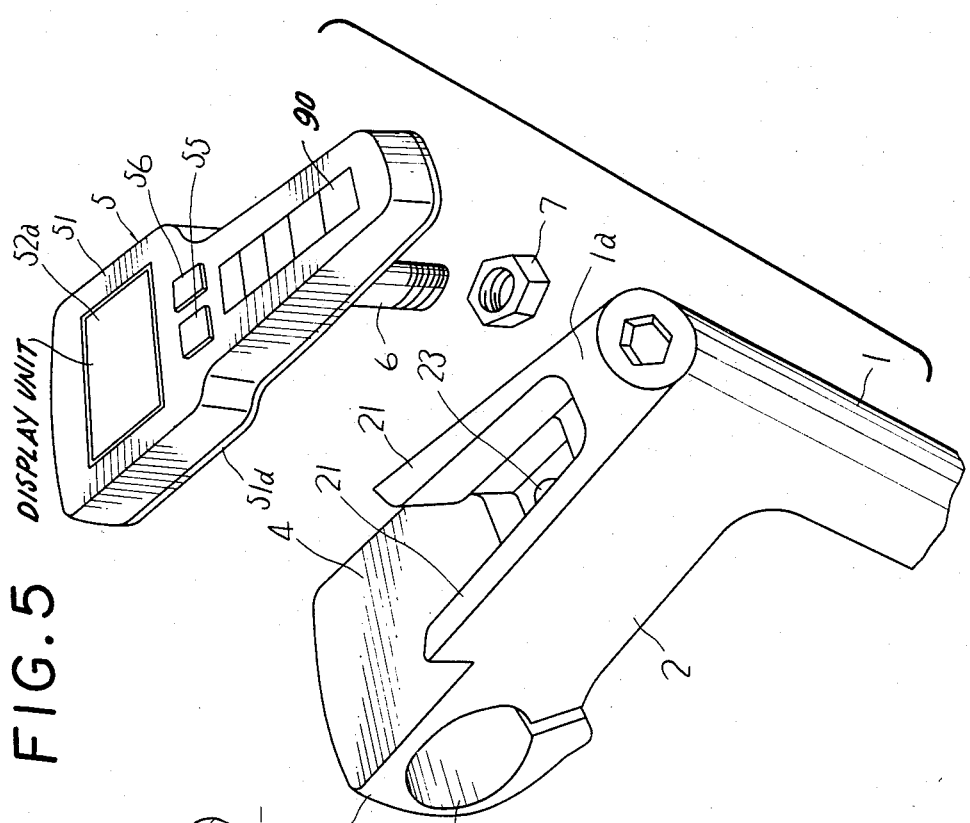
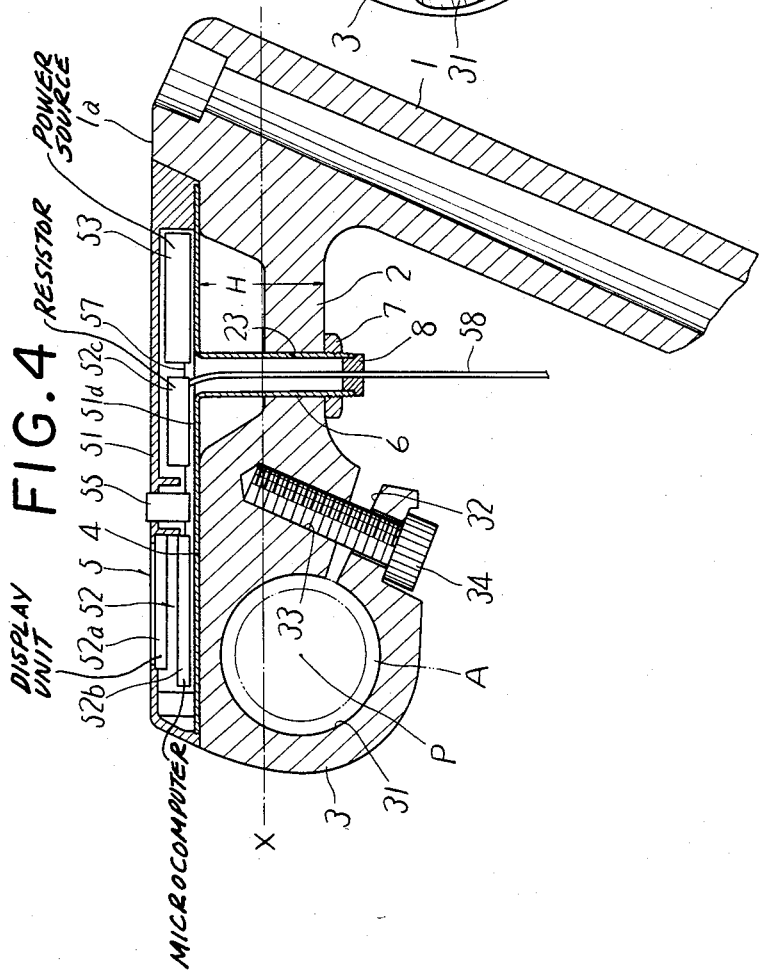

HANDLE STEM FOR A BICYCLE

FIELD OF THE INVENTION

This invention relates to a handle stem for a bicycle, on which a handle bar is mounted, and more particularly to a handle stem which comprises a stem body, a projecting portion extending radially outwardly of the body from the top thereof, and a holding portion having a through bore provided at the utmost end of the projecting portion to insertably support the handle bar the projecting portion supporting a display apparatus electrically displaying operation, such as speed or a running distance, of the bicycle.

BACKGROUND OF THE INVENTION

Conventionally, a display apparatus for electrically displaying speed or a running distance of the bicycle has been developed, which is mounted on the handle bar in the vicinity of its mounting position to the handle stem and projects slantwise upwardly from the handle bar.

Such a display apparatus must be mounted by use of a paticular member, such as a band means, which is hard to fix stably. Therefore, vibrations due to bicycle operation may shake or shift the display apparatus so that a driver cannot read an exact display. Also, the display apparatus projecting considerably outwardly is liable to hit a foreign object when the bicycle is running or falls down, thereby often leading to the danger of a breakdown.

SUMMARY OF THE INVENTION

In the light of the above problem, this invention has been designed. An object of the invention is to provide a handle stem for a bicycle, onto which the display apparatus is readily and stably mountable with a minimum outward projection without the use of any band means.

This invention is characterized in that the handle stem is provided with a projecting portion, a holding portion, and a display apparatus mounting surface which is formed at the upper portions of the projecting and holding portions and is continuous in the same plane so that the display apparatus, which comprises a box about the same in shape and in plane size as the mounting surface and electrical parts housed within the box, is mounted on the mounting surface.

Therefore, the display apparatus is mountable onto the projecting and holding portions at the handle stem readily and stably without the use of band means and scarcely projects outwardly from the handle bar. Also, the display apparatus mounted on the projecting and holding portions, is easily visible by a cyclist.

These and other objects of the invention will be become more apparent in the detailed description and examples which follow.

BRIEF DESCRIPTION OF THE DRAWINGS

FIG. 4 is a longitudinal sectional view of a modified embodiment of the invention, corresponding to FIG. 2, and FIG. 5 is a perspective view of the FIG. 4 embodiment in condition of dismounting the display apparatus from the handle stem.

DETAILED DESCRIPTION OF THE INVENTION

Figure 1:
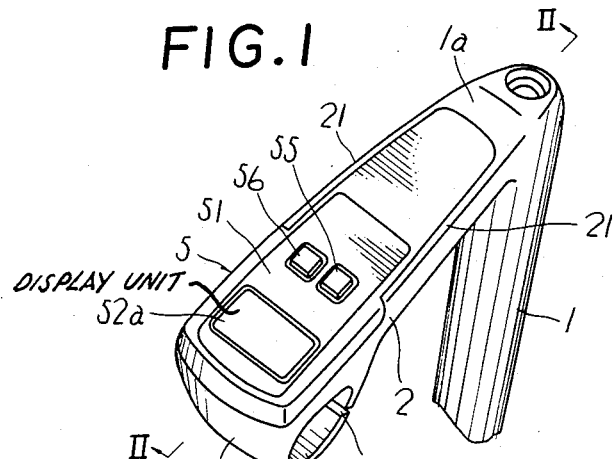
FIG. 1 is a partially omitted perspective view of an embodiment of a handle stem of the invention.

Referring to the drawing, the handle stem of the invention is shown which comprises a cylindrical stem body 1 mounted on the upper end of a front fork (not shown) at the bicycle frame, a projecting portion 2 extending radially outwardly from the top of stem body 1, and a holding portion 3 provided at the utmost end of projecting portion 2 and supporting a handle bar A. The holding portion 3 provides a through bore 31 extending perpendicularly to the lengthwise direction of projecting portion 2 and insertably supporting the handle bar A, a slit 32 through which the bore 31 is partially circumferentially open to the exterior, and a threaded bore 33, so that a bolt 34 inserted therein is screwed to contract the bore 31 in diameter, thereby fixing the handle bar A to the handle stem.

Figure 2:
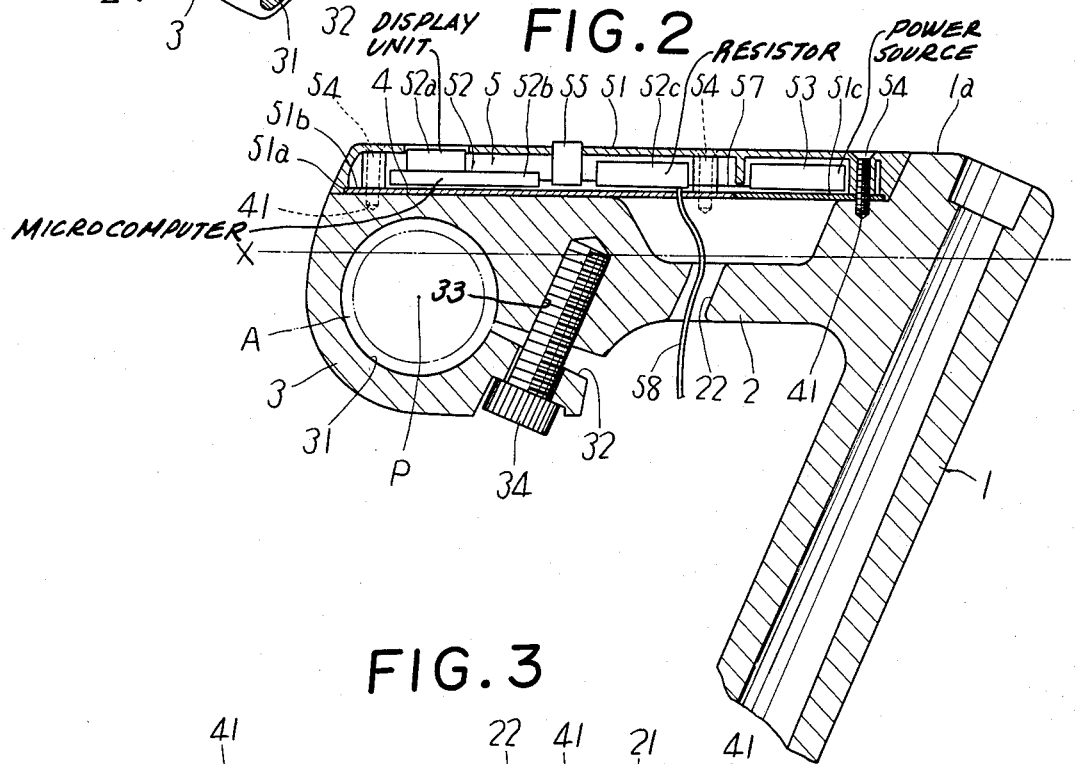
FIG. 2 is a sectional view taken on the line II—II in FIG. 1.

In FIGS. 1 and 2, the through bore 31 is positioned at the center thereof below the longitudinally extending center line X of the vertical length of projecting portion 2, and a mounting surface 4 for a display apparatus 5 to be discussed below is provided at the upper portions of projecting portion 2 and holding portion 3, the mounting surface 4 being made continuous on the same plane and positioned downwardly with respect to the top 1a of stem body 1 so that the display apparatus 5 can be about level at the surface with the top 1a, thereby restricting the upper surface of display apparatus 5 from projecting upwardly from the top 1a of handle stem 1. The projecting portion 2 provides a pair of walls 21 which protectively sandwich therebetween the display apparatus 5 and prevents it from shifting.

Figure 3:
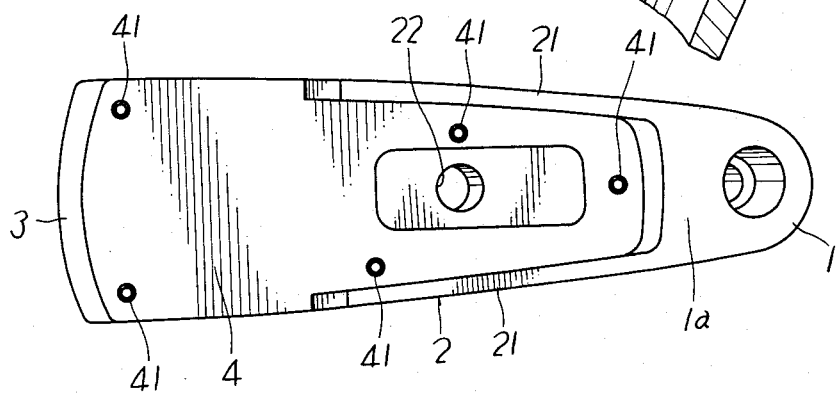
FIG. 3 is a plan view of the FIG. 1 embodiment, from which a display apparatus is removed.

Also, the projecting portion 2 and holding portion 3, as shown in FIG. 1, become larger in width at the upper portions gradually from the root of projecting portion 2 and the display apparatus mounting surface 4 similarly becomes larger in width as shown in FIG. 3.

The display apparatus 5 displays speed, a running distance, or a speed-change stage of the bicycle while running and comprises a box 51 about the same in shape and plane size as the mounting surface 4, electric parts 52 housed within the box 51 and displaying the above operation of the running bicycle, and a power source 53. The electric parts 52 amplify and compute in comparison detection signals from detectors provided at the bicycle frame for detecting the number of rotations of the wheel or hub and the speed-change stage for a derailleur, and display the signals digitally by a display unit 52a mainly of a liquid crystal.

The box 51 is open at the bottom about the same in shape and plane size as the mounting surface 4, and has at the bottom opening a stepped portion 51a through which two lids 51b and 51c are attached by use of a plurality of set screws 54 so as to close the opening. The box 51 also is elongate along the mounting surface 4 and becomes larger in width gradually from the root of projecting portion 2 and is fixed to the mounting surface 4 through the set screws 54 screwed with a plurality of threaded bores 41 provided at the mounting surface 4.

The electric parts 52 comprise an amplifier (not shown) for amplifying signals from the detectors, a microcomputer 52b for processing the signals, the display unit 52a for displaying the processed signals by the microcomputer 52b, and a resistor 52c. The amplifier, microcomputer 52b and resistor 52c are housed in the box 51 at its widened portion, the display unit 52a is provided at the surface of the same portion, a control switch 55 and a mode switch 56 for the electric parts 52 are provided behind the display unit 52a, and the power source 53 is housed in the narrow portion and connects with the electric parts 52 through a wire 57. A through bore 22 is provided at the projecting portion 2 and extends vertically to open at the mounting surface 4 so that a wire 58 connecting the electric parts 52 is drawn outwardly through the through bore 22. The aforesaid arrangement of display unit 52a, control switch 55 and mode switch 56, enables a driver to quickly read the display unit 52a because it is positioned away from him to be easily visible by him and facilitate operation of switches 55 and 56 because they are positioned toward him, thus improving safety in the bicycle's running. The power source 53 may employ, for example, a dry battery or solar battery 90, illustrated in FIG. 5. The solar battery, when used, may be preferably associated with a separate battery as of lithium-manganese battery to temporarily store the electricity generated by the solar battery.

Alternatively, the box 51, as shown in FIGS. 4 and 5, may be provided at its lower lid 51d with a tubular shaft 6 larger in vertical length than the projecting portion 2 and extending downwardly, and the projecting portion 2 may provide a through bore 23 through which the tubular shaft 6 passes and project downwardly from the lower surface of projecting portion 2, and a fixing means of a holder 7, such as a nut, may be attached to the projecting end of shaft 6. In this case, the display apparatus can be mounted readily by one holder 7, such as a nut, and further rigidly in a manner of vertically sandwiching the projecting portion 2. In addition, the mounting shaft 6 may be caulked at the utmost end in which case holder 7 is not used, and the holder 7, when used, may employ a snap ring of the C- or E-type.

The tubular mounting shaft 6 shown in FIGS. 4 and 5 connects the interior of box 51 with the exterior of projecting portion 2 so that the wire 58 is drawn out through the shaft 6, whereby a particular conduit for the wire 58 is not required. In addition, a tubular cap 8 is detachably attached to the tip of shaft 6.

As seen from the above, the handle stem of the invention is provided at its projecting and holding portions 2 and 3 with the mounting surface 4 continuous in the same plane so that the display apparatus 5 is mountable stably and rigidly on the mounting surface 4, thereby being prevented from shaking or shifting caused by vibrations of the running bicycle. Also, the box 51 is formed about the same in shape and plane size as the mounting surface 4 so that the display apparatus 5 scarcely projects from the handle stem to ensure safety in the bicycle's running.

The display apparatus 5 mounted on the upper portions of the projecting portion 2 and holding portion 3 at the handle stem, is easily visible by the driver without neglecting his forward view.

Also, the provision of mounting surface 4 makes it possible to facilitate the mounting of display apparatus 5 by a simple holder, such as a set screw, instead of the band means.

While preferred embodiments of the invention have been described using specific terms, such description is for illustrative purpose only, and it is to be understood that changes and variations may be made without departing from the spirit or scope of the invention which is defined in the following claims.

What is claimed is:

1. A handle stem for a bicycle comprising a stem body, a projecting portion having an elongated recessed mounting portion and extending radially outwardly of said stem body from a top thereof, a holding portion provided at a distal end of said projecting portion and having a deformable clamp defining an insertion bore for receiving a handle bar, and a display apparatus which electrically displays operating conditions of the bicycle, said display apparatus including a box member mounted in said mounting portion and containing electric parts for producing a display of at least one operating condition of a bicycle, said electric parts including a means for processing at least one signal representative of said operating condition of the bicycle and a display unit connected to said signal processing means and mounted at the surface of said box member, said display unit displaying said operating condition, said box member having an elongate shape extending longitudinally of said projecting portion and holding portion at said handle stem, said box member having at a front portion thereof said display unit and at a rear portion thereof a control unit and housing within the front portion said electric parts and within the rear portion a power source.

2. A handle stem for a bicycle according to claim 1, wherein said power source employs a solar battery.

3. A handle stem for a bicycle comprising a stem body, a projecting portion having an elongated recessed mounting portion and extending radially outwardly of said stem body from a top thereof, a holding portion provided at a distal end of said projecting portion and having a deformable clamp defining an insertion bore for receiving a handle bar, and a display apparatus which electrically displays operating conditions of the bicycle, said projecting portion and holding portion having at their upper portions a mounting surface for receiving and supporting said display apparatus; said mounting surface being elongated and continuous on the same plane, said display apparatus including a box member mounted in said mounting portion and containing electric parts for producing a display of at least one operating condition of a bicycle, said electric parts including a means for processing at least one signal representative of said operating condition of the bicycle and a display unit connected to said signal processing means and mounted at the surface of said box member, said display unit displaying said operating condition, said box member being of about the same shape and planar size as said mounting surface and being mounted on and supported by said mounting surface, said projecting portion having upstanding wall members between which said display apparatus is mounted, said upstanding wall members covering at least a portion of the lateral sides of said box member.

4. A handle stem for a bicycle according to claim 3, wherein the center of said insertion bore at said projecting portion is positioned downwardly from a longitudinally extending center line of a vertical length of said projecting portion.

5. A handle stem for a bicycle according to claim 3, wherein said mounting surface at said projecting portion and holding portion is positioned downwardly with respect to the top of said stem body so that said display apparatus, when mounted on said mounting surface, is about level at the upper surface with the top of said stem body.

6. A handle stem for a bicycle according to claim 3, wherein said display apparatus has a mounting shaft having a length larger than a vertical length of said projecting portion which extends downwardly, said projecting portion having a mounting bore through which said mounting shaft projects so that said mounting shaft, when said display apparatus is mounted on said mounting surface, projects through said mounting bore and downwardly from a lower surface of said projecting portion, said mounting shaft having a fixing means for fixing said mounting shaft to said projecting portion.

7. A handle stem for a bicycle according to claim 6, wherein said mounting shaft is hollow and serves as a conduit for drawing to the exterior a wire which electrically connects with said display apparatus.

* * * * *